US011145422B2

(12) United States Patent
Harkness et al.

(10) Patent No.: US 11,145,422 B2
(45) Date of Patent: Oct. 12, 2021

(54) POOL TYPE LIQUID METAL FAST SPECTRUM REACTOR USING A PRINTED CIRCUIT HEAT EXCHANGER CONNECTION TO THE POWER CONVERSION SYSTEM

(71) Applicant: Westinghouse Electric Company LLC, Cranberry Township, PA (US)

(72) Inventors: Alexander W. Harkness, Gibsonia, PA (US); Cory A. Stansbury, Standish, ME (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 550 days.

(21) Appl. No.: 16/149,595

(22) Filed: Oct. 2, 2018

(65) Prior Publication Data
US 2019/0103195 A1 Apr. 4, 2019

Related U.S. Application Data

(60) Provisional application No. 62/568,486, filed on Oct. 5, 2017, provisional application No. 62/566,980, filed on Oct. 2, 2017.

(51) Int. Cl.
*G21C 1/03* (2006.01)
*F28D 9/00* (2006.01)
(Continued)

(52) U.S. Cl.
CPC ............ *G21C 1/03* (2013.01); *F28D 9/0037* (2013.01); *F28F 9/001* (2013.01); *F28F 9/16* (2013.01);
(Continued)

(58) Field of Classification Search
CPC ... G21C 1/02; G21C 1/03; G21C 1/32; G21C 1/322; G21C 1/326; F28D 9/0031; F28D 9/0037; F28D 9/0043; F28F 2275/061
See application file for complete search history.

(56) References Cited

U.S. PATENT DOCUMENTS 2,841,545 A * 7/1958 Zinn ..................... G21C 1/02
376/171
2,877,000 A * 3/1959 Person .................. F28D 9/0031
165/159

(Continued)

FOREIGN PATENT DOCUMENTS

| JP | 06230170 A | 8/1994 |
| KR | 1020140075205 A | 6/2014 |
| WO | 2019083695 A2 | 5/2019 |

OTHER PUBLICATIONS

International Searching Authority, International Search Report and the Written Opinion for International Application No. PCT/US2018/053897, dated May 20, 2019.

(Continued)

*Primary Examiner* — Sharon M Davis
(74) *Attorney, Agent, or Firm* — K&L Gates LLP

(57) ABSTRACT

A printed circuit heat exchanger for use in a reactor includes a core formed from a stack of plates diffusion bonded together. The core has: a top face, a bottom face disposed opposite the top face, a first side face extending between the top face and the bottom face, and a second side face disposed opposite the first side face. The printed circuit heat exchanger includes: a plurality of primary channels defined in the core, each of the primary channels extending from a primary inlet defined in the first side face to a primary outlet defined in the second side face; and a plurality of secondary channels defined in the core, each of the secondary channels extending among at least some of the primary channels from (Continued)

a secondary inlet defined in the top face to a secondary outlet defined in the top face.

8 Claims, 7 Drawing Sheets

(51) Int. Cl.
| | | |
|---|---|---|
| *F28F 9/00* | (2006.01) | |
| *F28F 9/26* | (2006.01) | |
| *G21C 15/14* | (2006.01) | |
| *F28F 9/16* | (2006.01) | |
| *F28D 21/00* | (2006.01) | |

(52) U.S. Cl.
CPC ............... *F28F 9/26* (2013.01); *G21C 15/14* (2013.01); *F28D 2021/0054* (2013.01); *F28F 2275/061* (2013.01)

(56) References Cited

U.S. PATENT DOCUMENTS

| | | | | |
|---|---|---|---|---|
| 4,249,995 A | * | 2/1981 | Jogand | G21C 1/03 376/403 |
| 4,270,602 A | * | 6/1981 | Foster | F28D 9/0043 165/167 |
| 4,342,721 A | * | 8/1982 | Pomie | F28D 7/1669 376/298 |
| 4,665,975 A | * | 5/1987 | Johnston | F28F 9/0275 165/167 |
| 4,949,363 A | * | 8/1990 | Tupper | G21C 13/024 376/260 |
| 7,033,553 B2 | | 4/2006 | Johnston et al. | |
| 7,526,057 B2 | | 4/2009 | Sim et al. | |
| 8,157,000 B2 | * | 4/2012 | Johnston | F28D 9/005 165/167 |
| 2011/0222642 A1 | * | 9/2011 | Gautier | G21C 1/02 376/395 |
| 2012/0099694 A1 | | 4/2012 | Inatomi et al. | |
| 2017/0309354 A1 | * | 10/2017 | Kim | G21C 17/002 |

OTHER PUBLICATIONS

International Preliminary Report on Patentability for International PCT Application No. PCT/US2018/053897, dated Apr. 8, 2020.

\* cited by examiner

POOL TYPE LIQUID METAL FAST SPECTRUM REACTOR USING A PRINTED CIRCUIT HEAT EXCHANGER CONNECTION TO THE POWER CONVERSION SYSTEM

CROSS-REFERENCE TO RELATED APPLICATIONS

This patent application claims the priority benefit under 35 U.S.C. § 119(e) of U.S. Provisional Application No. 62/566,980 filed on Oct. 2, 2017, and U.S. Provisional Application No. 62/568,486 filed on Oct. 5, 2017, the contents of which are each herein incorporated by reference.

FIELD OF THE INVENTION

The present invention is directed to pool type liquid metal fast spectrum reactors, and more particularly to pool type liquid metal fast spectrum reactors utilizing printed circuit heat exchangers. The present invention also relates to printed circuit heat exchangers for use in pool type liquid metal fast spectrum reactors.

BACKGROUND OF THE INVENTION

To date, liquid metal reactor designs such as, without limitation, a lead-cooled fast spectrum reactor, have proposed the use of spiral tube or bayonet style steam generators. The size of these types of steam generators requires the reactor vessel that hosts them to be quite large in diameter, significantly increasing the primary coolant inventory. Furthermore, the need for an internal "hot leg" in a traditional configuration also increases the height of the vessel. For a lead-cooled reactor, this significant increase in coolant inventory translates to significant weight that must be seismically supported to protect the nuclear safety related plant components. Also, traditional steam generators use a high number of relatively large diameter tubes to form the heat transfer area. These tubes introduce the risk of a reactor coolant system (RCS) pressurization event, which requires either containment or high-volume filtering, as well as an inadvertent criticality event resulting from the rupture of one or more of these tubes. It is typically postulated that steam or other secondary side fluid could be drawn into the core following a tube rupture, producing a dramatic shift in moderation and neutron absorption and subsequently producing a local criticality event. The magnitude of the associated event would be sufficient to result in significant fuel damage. Accordingly, there exists a need for improved cooling arrangements for reactors.

SUMMARY OF THE INVENTION

Embodiments of the present invention take advantage of the inherent characteristics of a micro channel heat exchanger such, as a printed circuit heat exchanger (PCHE), to significantly reduce the size of a pool type liquid metal cooled fast spectrum reactor. Such embodiments do so while effectively eliminating the only source of reactor coolant system pressurization and the primary source of an inadvertent criticality event that is typically associated with this type of reactor.

Embodiments of the invention involve the deployment of multiple printed circuit heat exchangers such as to form a conduit between the discharge plenum above the reactor core and the inlet to the primary coolant pumps. The higher temperature coolant passes through the heat exchanger radially towards an annular plenum that maintains a coolant supply to the reactor coolant pumps.

As one aspect of the invention a printed circuit heat exchanger comprises: a core formed from a stack of plates diffusion bonded together, the core having: a top face, a bottom face disposed opposite the top face, a first side face extending between the top face and the bottom face, and a second side face disposed opposite the first side face; a plurality of primary channels defined in the core, each of the primary channels extending from a primary inlet defined in the first side face to a primary outlet defined in the second side face; and a plurality of secondary channels defined in the core, each of the secondary channels extending among at least some of the primary channels from a secondary inlet defined in the top face to a secondary outlet defined in the top face.

The printed circuit heat exchanger may further comprise: an inlet plenum defining a first space therein, the first space in fluid communication with the secondary inlets; and an outlet plenum defining a second space therein, the second space in fluid communication with the secondary outlets.

The inlet plenum may comprise a main inlet structured to be fluidly coupled to a supply header, and the outlet plenum may comprise a main outlet structured to be fluidly coupled to a return header.

The secondary channels may be semi-circular in cross-section.

As another aspect of the invention a pool type liquid metal fast spectrum reactor comprises: a vessel; a lower plenum defined in the vessel; a reactor core disposed in the vessel above the lower plenum; an upper plenum defined in the vessel above the reactor core; a number of coolant pump inlet plenums defined in the vessel; a number of coolant pumps, each coolant pump being structured to move a fluid from one of the number of coolant pump inlet plenums to the lower plenum; and a number of printed circuit heat exchangers, each printed circuit heat exchanger disposed between the upper plenum and one of the number of coolant pump inlet plenums. Each printed circuit heat exchanger comprises: a core formed from a stack of plates diffusion bonded together, the core having: a top face, a bottom face disposed opposite the top face, a first side face extending between the top face and the bottom face, and a second side face disposed opposite the first side face; a plurality of primary channels defined in the core, each of the primary channels extending from a primary inlet defined in the first side face to a primary outlet defined in the second side face, wherein each primary inlet is in direct fluid communication with the upper plenum, and wherein each primary outlet is in direct fluid communication with one coolant pump inlet plenum of the number of coolant pump inlet plenums; and a plurality of secondary channels defined in the core, each of the secondary channels extending among at least some of the primary channels from a secondary inlet defined in the top face to a secondary outlet defined in the top face.

The reactor may further comprise: an inlet plenum defining a first space therein, the first space in fluid communication with the secondary inlets; and an outlet plenum defining a second space therein, the second space in fluid communication with the secondary outlets.

The vessel may house a volume of a primary coolant therein, wherein the volume of the primary coolant has a maximum level within the vessel, and wherein the inlet plenum and the outlet plenum are disposed above the maximum level.

The vessel may comprise a top lid, and the inlet plenum and the outlet plenum may be disposed above the top lid.

The inlet plenum may comprise a main inlet structured to be fluidly coupled to a supply header, and the outlet plenum may comprise a main outlet structured to be fluidly coupled to a return header.

The secondary channels may be semi-circular in cross-section.

The number of printed circuit heat exchangers may comprise a plurality of heat exchangers; the number of coolant pump inlet plenums may comprise a plurality of coolant pump inlet plenums; the number of coolant pumps may comprise a plurality of coolant pumps; the plurality of printed circuit heat exchangers and the plurality of coolant pumps may be arranged in pairs in an annular ring above and outboard of the reactor core.

The plurality of printed circuit heat exchangers may comprise six printed circuit heat exchangers, and the plurality of coolant pumps may comprise six coolant pumps.

Each printed circuit heat exchanger may form at least a portion of a partition separating the upper plenum from a respective coolant pump inlet plenum.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention will now be described more fully hereinafter with reference to the accompanying drawings, in which examples of the invention are shown. The invention may, however, be embodied in many different forms and should not be construed as limited to the examples set forth herein. Rather, these examples are provided so that this disclosure will be thorough and complete, and will fully convey the scope of the invention to those skilled in the art. Like numbers refer to like elements throughout.

As used herein, "number" shall be used to refer to any non-zero integer, i.e., one or a quantity greater than one (i.e., a plurality).

A printed circuit heat exchanger (PCHE) is comprised of a stack of chemically etched plates that are diffusion bonded together such that discrete micro channels form for each of the process fluids between which heat is to be exchanged. Such configuration allows a relatively large heat transfer area to exist in a small volume. In one embodiment of the present invention, the use of a PCHE in lieu of a spiral wound tube style heat exchanger, the diameter of the reactor is reduced from about 11.5 meters to about 8 meters and the associated volume of coolant required is reduced to approximately 50% of its original volume. For a lead-cooled reactor example, the total weight of the coolant would be reduced from approximately 7,500,000 kg to approximately 3,500,000 kg, subsequently reducing the cost of the seismically qualified structures required to support this weight. Such reduction in coolant mass also simplifies the challenges associated with chemistry control and corrosion protection.

Departing from the traditional PCHE configuration, in the present invention the secondary side micro channels are generally u-shaped, allowing for both of the supply and return headers for the secondary side fluid to be attached to a single side of the PCHE. This configuration allows for the PCHE to be positioned in a pool type reactor such that the supply and return headers and the associated piping remain at least above the level of the primary coolant, and preferably above the reactor lid. Given that any postulated rupture of the supply and return headers and supply piping would not result in the introduction of secondary side fluid into the primary coolant, the associated risk of a related criticality event is greatly reduced or eliminated by this arrangement. In addition, this generally eliminates the only pressurization source within the RCS, eliminating pressure-holding containment requirements or large volume filtered vents.

Another modification from a traditional PCHE is the use of larger channels for the primary flow. This "hybrid" arrangement optimizes the flow channel size and shape for each working fluid, accounting for their heat transfer characteristics as well as desired thermo-hydraulic performance and plugging avoidance.

Figure 1:
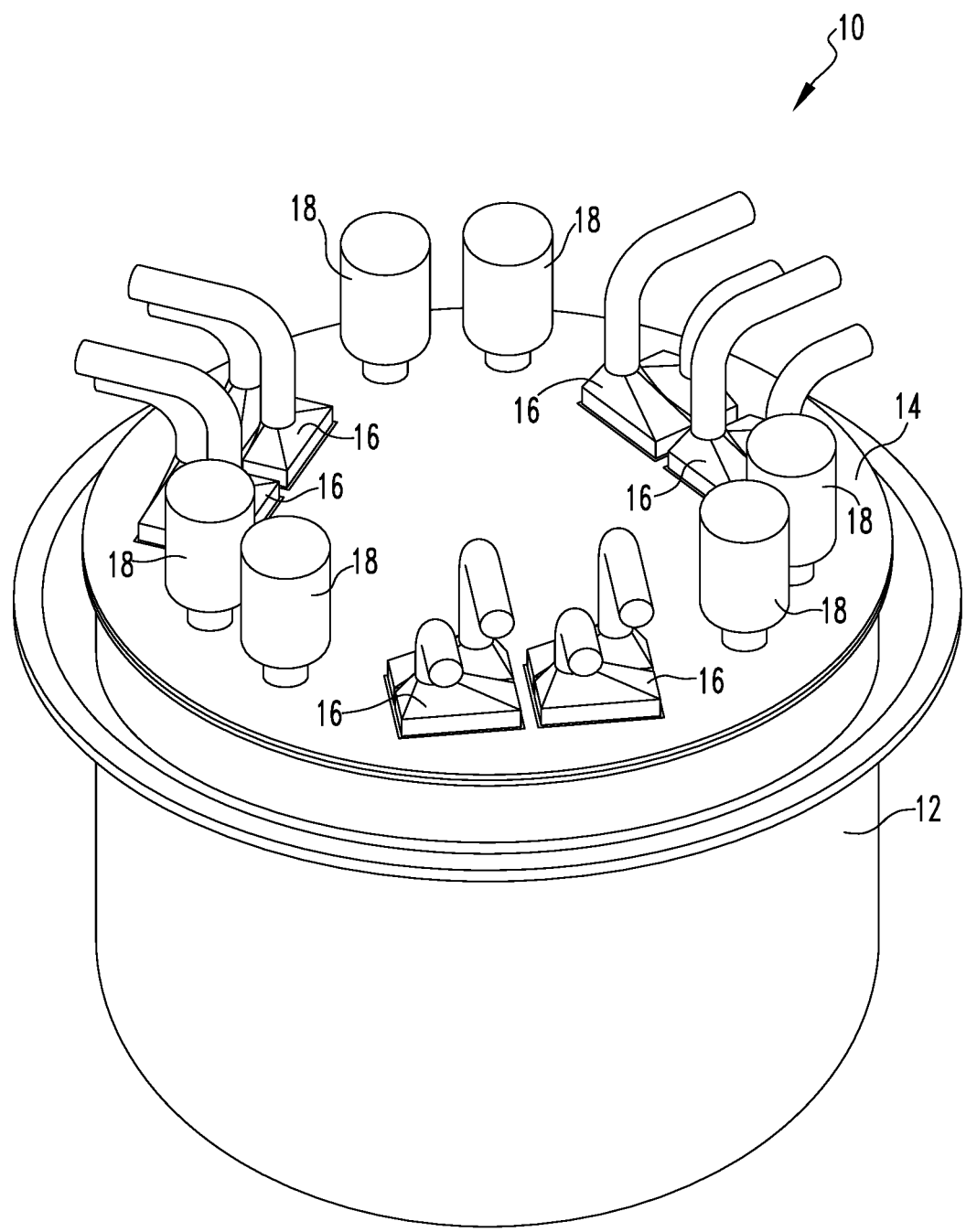
FIG. 1 is a schematic isometric view of a reactor in accordance with an example embodiment of the present invention.
Figure 2:
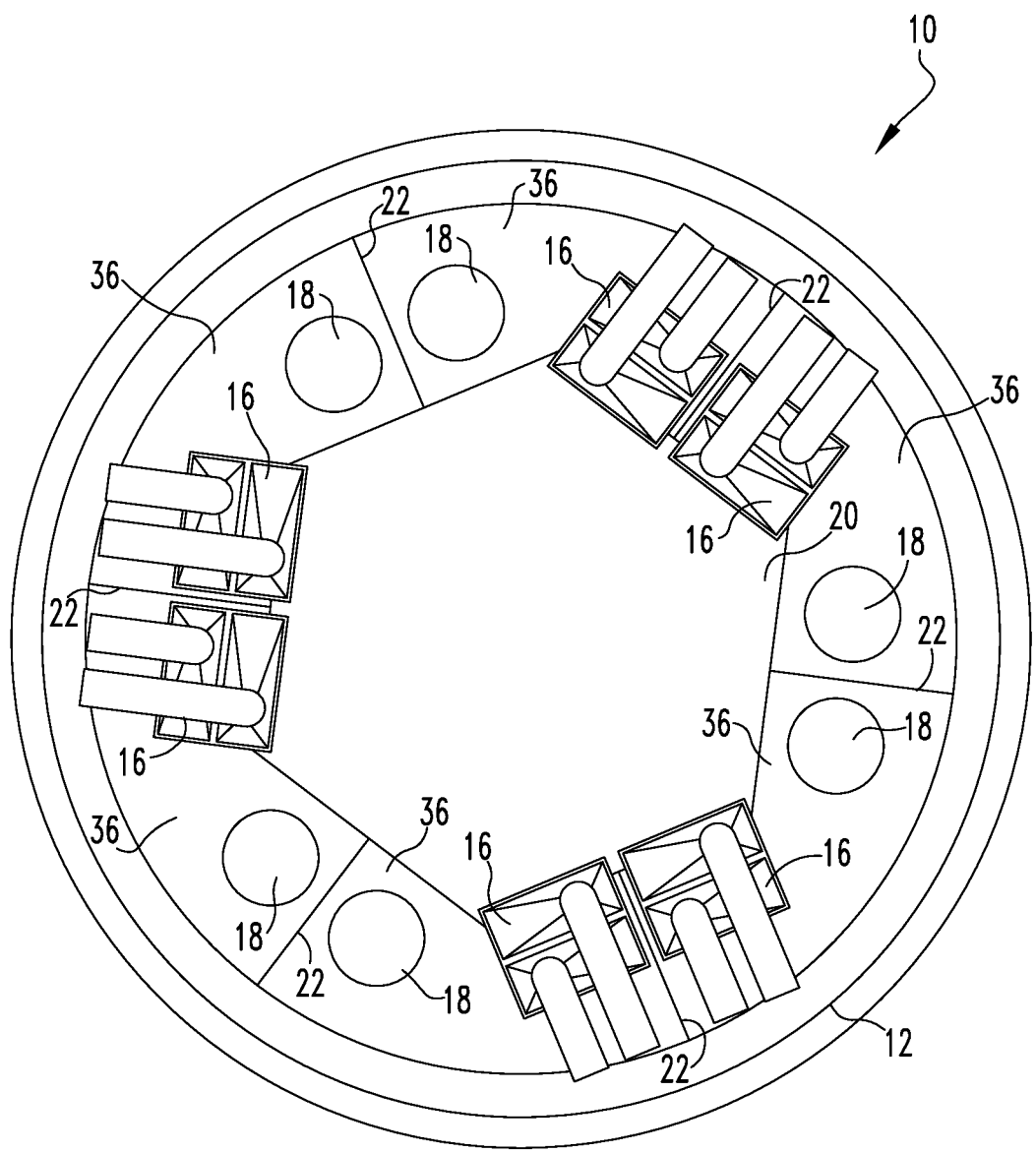
FIG. 2 is a schematic plan view of the reactor of FIG. 1 shown with the reactor lid transparent so as to show details of the layout of components within the reactor vessel.

A schematic isometric view of a reactor 10 in accordance with an example embodiment of the present invention is illustrated in FIG. 1. Reactor 10 includes, and is generally defined by, an outer vessel 12, and a lid 14. Reactor 10 further includes a number of printed circuit heat exchangers (PCHEs) 16 and a number of primary coolant pumps 18, each shown in-part extending outward from lid 14. In the example embodiment described herein, an arrangement of six PCHEs 16 (PCHEs) and six primary coolant pumps 18 are utilized. As shown in FIG. 2, the PCHEs 16 and coolant pumps 18 are arranged in pairs in an annular ring outboard of a reactor core 20. Also, in the illustrated example embodiment, each pump 18 is paired to a PCHE 16. Such pairing is achieved through the use of radial baffles 22 that create a flow path that is unique to each pair. The incorporation of a unique flow path allows for single or multiple PCHE(s) 16 and corresponding pumps 18 to be removed from service while continuing with plant operation. The operator may choose to remove a PCHE 16 from service for maintenance/service or to adjust power output level for load following maneuvers. It is to be appreciated that numerous alternate quantities and/or arrangements of pumps 18 and PCHEs 16 can be utilized without varying from the scope of the present invention.

Figure 3:
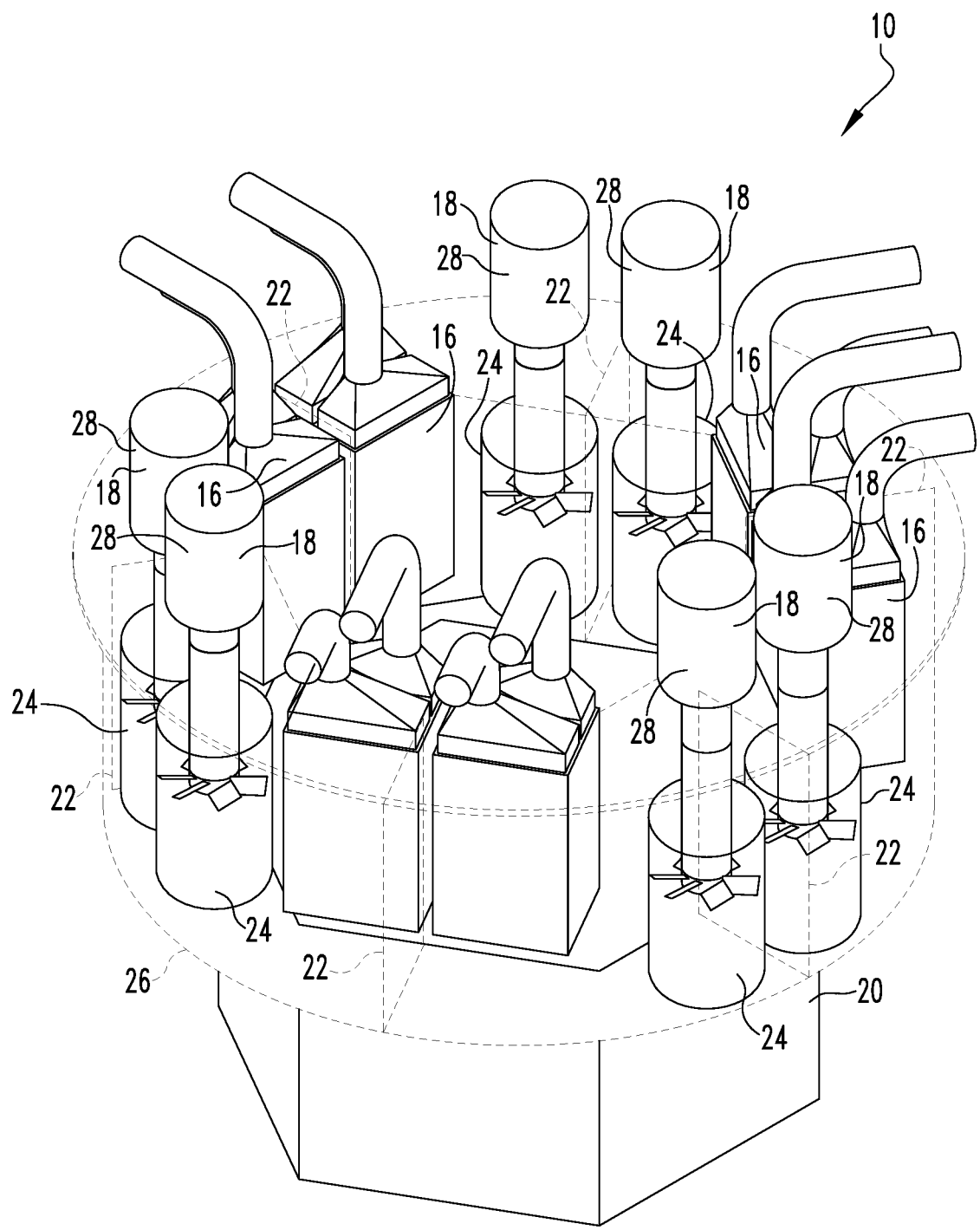
FIG. 3 is another schematic isometric view of the reactor of FIG. 1 shown with the reactor lid, reactor vessel, and portions of other components transparent to show details of internal components of the reactor.

FIGS. 1-3 provide schematic illustrations of the reactor 10 and reactor internals layout for one example embodiment of the invention. In these figures, the support structures for the coolant pumps 18 and the PCHEs 16 are depicted as transparent to allow for a better understanding of the physical characteristics of the equipment and its position within the reactor vessel 12. FIG. 2, a plan view of the reactor 10, best illustrates the hexagonal shape of the reactor core 20. In this depiction, the reactor core 20 is assumed to be comprised of multiple hexagonal fuel and neutron reflector elements, such that the overall shape of the reactor core 20 itself is hexagonal. This is one of many possible arrangements that can be proposed for a fast reactor. In this case, the arrangement of six pairs of pumps 18 and PCHEs 16 works well with the assumed hexagonal shape of the reactor core 20.

FIG. 2 also best illustrates the radial baffles 22 that form the separate flow paths for each pump 18 and PCHE 16 pair. The radial baffles 22 can be seen separating each pair of PCHEs 16 and each pair of coolant pumps 18.

FIG. 3 provides an isometric view of the components that are housed within the reactor 10 and supported by the reactor internal structures (shown as transparent). In the illustrated example embodiment, each pump 16 is presumed to be a propeller style axial pump that uses a cylindrical baffle 24 that is integral to reactor internals support structure 26. This pump style allows the electric motor 28 of each pump 16 to be located above the free surface of the reactor coolant and in this case above the 12, and thus outside of the reactor 10 itself, thus removed from the high temperature environment. It is to be appreciated that other pump arrangements may be utilized without varying from the scope of the present invention.

Figure 4:
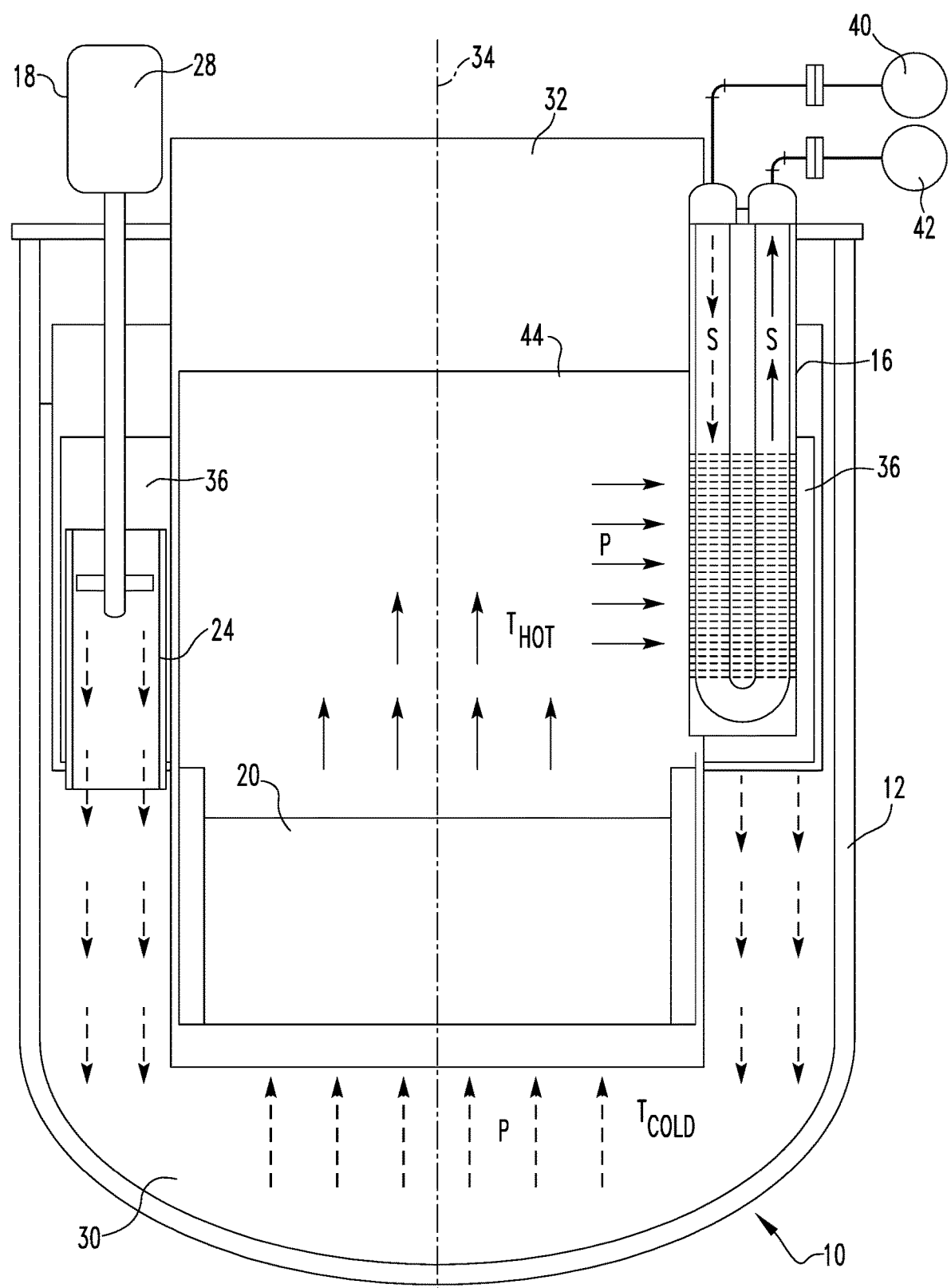
FIG. 4 is a schematic sectional view of a reactor such as shown in FIG. 1 with primary coolant flow depicted.

FIG. 4 shows an elevation schematic of preferred embodiment of the invention. In this figure, solid (heated coolant) and dashed (cooled coolant) arrows are used to depict the flow of primary and secondary coolant and its relative temperature. Designating primary coolant discharging from the reactor core 20 as having a temperature $T_{hot}$ and primary coolant discharging from the PCHE 16 as $T_{cold}$, the primary circuit of the reactor can be described as follows. Primary coolant enters the primary coolant pumps 18 at $T_{cold}$. The primary coolant P is pressurized by the pump 18 as it enters the reactors lower plenum 30. The coolant then passes through the channels of the fuel assemblies and is heated to $T_{hot}$ by the nuclear fission reaction in the reactor core 20 and discharged to the upper plenum 32. From the upper plenum 32, the primary coolant is allowed to flow radially (i.e., outward from longitudinal axis 34 of FIG. 4) through the micro channels of the PCHE 16 back into reactor coolant pump inlet plenum 36. While passing through the PCHE 16, the primary coolant P transfers its heat to the secondary side fluid S and in doing so is returned to $T_{cold}$. From such heat transfer, the secondary side fluid S is heated and then used in the power conversion system (not illustrated) to produce electricity through a turbine generator set.

Figure 5:
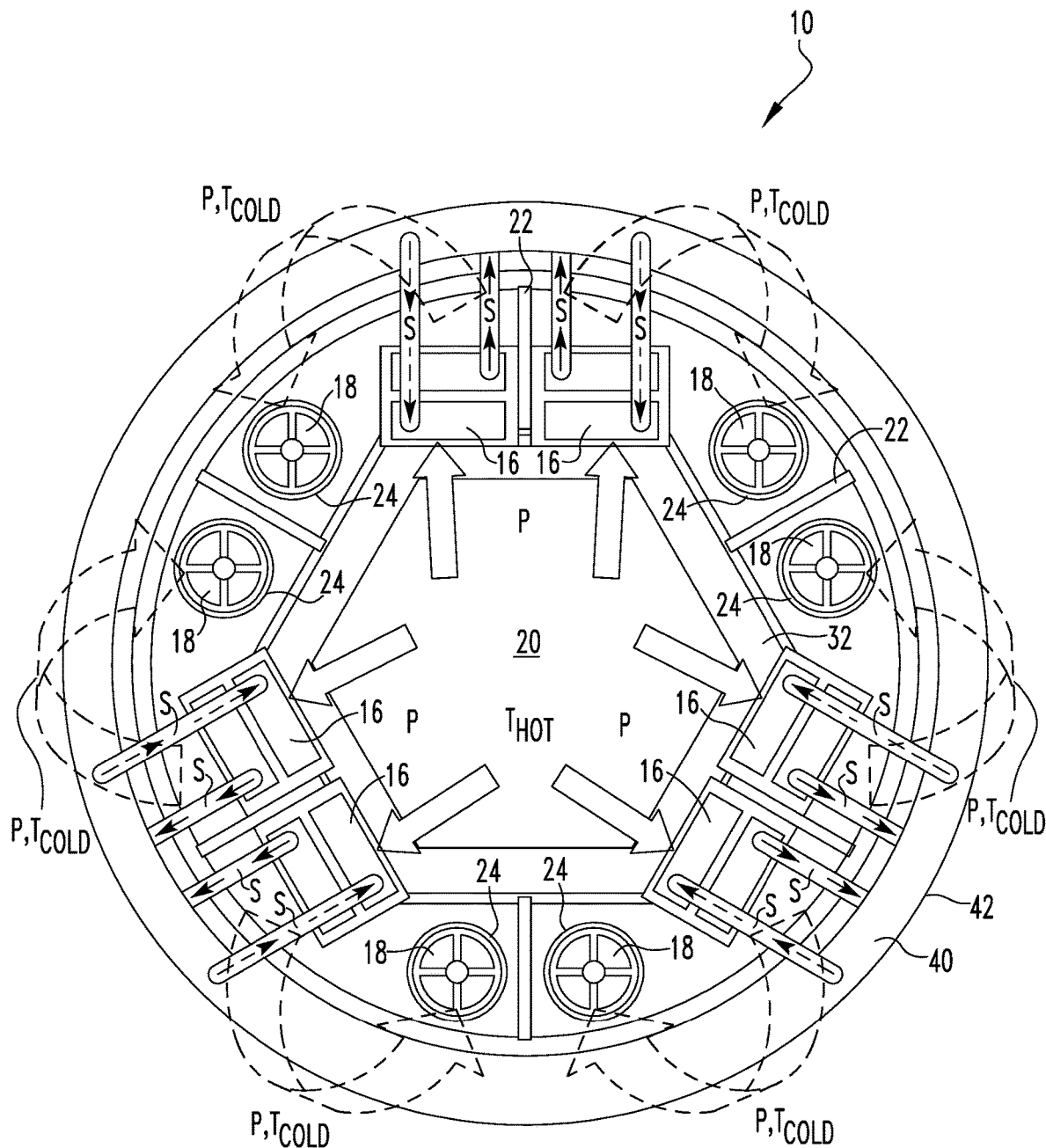
FIG. 5 is a schematic plan view of a reactor such as shown in FIG. 1 with primary coolant flow depicted.

FIG. 5 provides a two-dimensional schematic top view of the reactor 10. This view shows one possible arrangement where the six PCHEs 16 are connected to a single supply header 40 and a single return header 42 (disposed directly below supply header 40). It also shows the primary coolant P flow paths from the plan view perspective, using solid (heated coolant) and dashed (cooled coolant) arrows to indicate the relative temperature.

In the example illustrated embodiment, PCHE supply and return headers 40,42 are located outside of the reactor 10 well above the free surface 44 of the primary coolant P (it is also to be appreciated that embodiments of the present invention allow for the supply and return headers to be positioned outside of the primary nuclear containment as well). In this arrangement, a postulated rupture of either the supply or return header or the supply and return piping for an individual PCHE 16 would not pressurize the reactor 10 or introduce secondary side fluid S into the primary coolant P. Only the micro channels 46 (FIG. 7) of the PCHE 10 are submerged below the free surface 44 in the primary coolant P, thereby significantly reducing the risk of an inadvertent criticality event from a postulated rupture of the secondary side system.

Referring again to FIG. 4, the anticipated relative free surface level 44 for the primary coolant P are shown. When operating, the primary coolant pumps 18 will raise the free surface level 44 of the primary coolant P in the core discharge plenum 32 providing the driving head necessary to push the primary coolant P through the primary side micro channels 48 (FIG. 6) of the PCHE 16.

Figure 6:
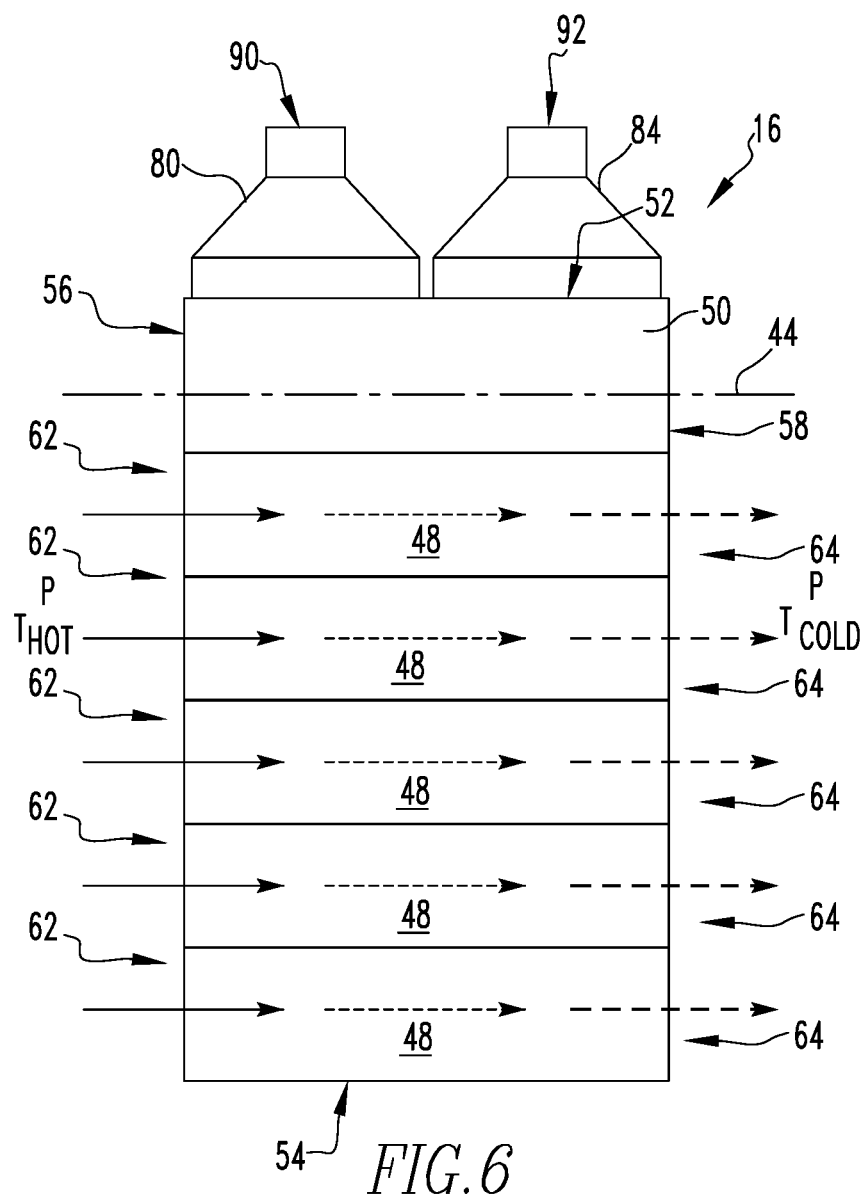
FIG. 6 is a schematic elevation view of a printed circuit heat exchanger in accordance with an example embodiment of the present invention showing primary coolant flow therethrough.
Figure 7:
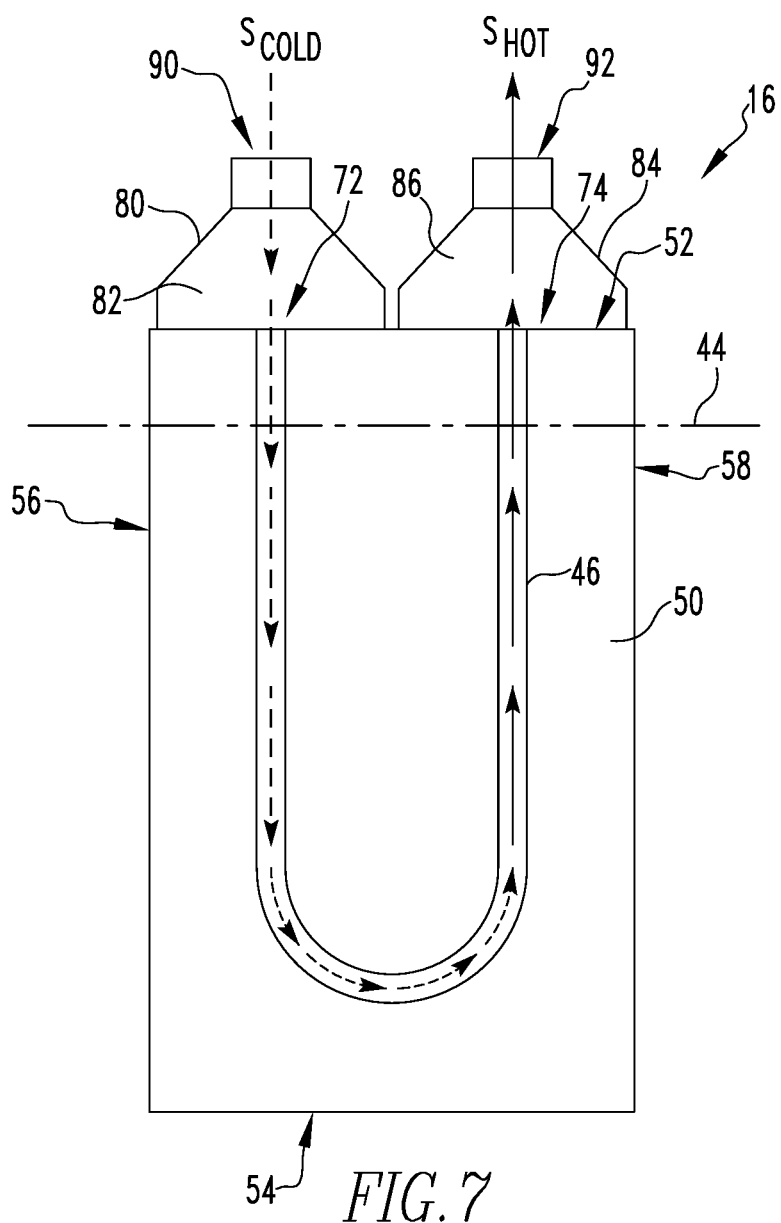
FIG. 7 is a schematic view of the printed circuit heat exchanger of FIG. 6 showing secondary side coolant flow therethrough.

FIGS. 6 and 7 illustrate a schematic elevation view of a PCHE 16 in accordance with an example embodiment of the present invention showing a schematic representation of the flow of primary coolant P therethrough (FIG. 6) and a schematic representation of the flow of secondary fluid S therethrough (FIG. 7). PCHE 16 includes a core 50 formed from a stack of plates diffusion bonded together. The core 50 includes: a top face 52, a bottom face 54 disposed opposite top face 52, a first side face 56 extending between the top face 52 and the bottom face 54, and a second side face 58 disposed opposite the first side face 56.

Referring to FIG. 6, PCHE 16 further includes a plurality of primary channels 48 (five are shown in FIG. 6) defined in the core 50. Each of the primary channels 48 extend from a primary inlet 62 defined in the first side face 56 to a primary outlet 64 defined in the second side face 58. Each of primary channels 48 may take on many different shapes or forms without varying from the scope of the present invention. For example, primary channels may be formed by machining, plate forming, or any other suitable process without varying from the scope of the present invention.

Referring to FIG. 7, PCHE 16 further includes a plurality of secondary channels 46 (only one is shown in the illustrated example) defined in the core 50, each of the secondary channels 46 extends among at least some of the primary channels 48 from a secondary inlet 72 defined in the top face 52 of core 50 to a secondary outlet 74 defined in the top face 52 of core 50. Each of secondary channels 46 may be formed via an etching process. Accordingly, secondary channels 46 typically have a semi-circular, circular, or oval cross-section. However, it is to be appreciated that secondary channels 46 may have other cross-sectional shapes without varying from the scope of the present invention.

As shown in both FIGS. 6 and 7, PCHE 16 further includes an inlet plenum 80 which defines a first space 82 therein which is in fluid communication with the secondary inlets 72; and an outlet plenum 84 which defines a second space 86 therein which is in fluid communication with the secondary outlets 74. The inlet plenum 80 includes a main inlet 90 which is structured to be fluidly coupled to a supply header, and the outlet plenum 84 includes a main outlet 92 which is structured to be fluidly coupled to a return header.

Although shown as being generally straight or U-shaped, it is to be appreciated that the shape of primary channels 48 and secondary channels 46 may vary without varying from the scope of the present invention. It also to be appreciated primary channels 48 and secondary channels 46 may be arranged generally according to various flow patterns, e.g., without limitation, cocurrent, countercurrent, cross-current, or combinations thereof, without varying from the scope of the present invention.

From the foregoing examples it is to be appreciated that the arrangement within the reactor results in a compact design that reduces the size of the reactor, the required inventory of coolant and the associated reduction in weight and chemistry control difficulty associated with both. The micro channels used on the secondary side of each PCHE eliminates the risk of a criticality event resulting from a pipe rupture typically associated with traditional steam generators. The micro channels used on the secondary side of the PCHE eliminates the risk of a large pressurization source within the RCS, eliminating the need for high-pressure containment or large-volume filtering. The micro channels used on the primary side of the PCHE are of a different size than those on the secondary side. This optimizes performance and meets the design objectives unique to each heat transfer medium. Modifications to a conventional PCHE that facilitate the removal of the criticality risk are: introduction of u-shaped secondary side fluid micro-channels; connection of secondary side fluid supply and return plenums to a single side; and secondary supply and return headers remain above the level of the primary coolant (and outside of the reactor and/or outside of the primary nuclear containment). The arrangement allows for the deployment of reactivity control devices such as control rods directly above the reactor core. The arrangement promotes natural circulation of the primary coolant in the event that power is lost to the primary coolant pumps. The arrangement reduces corrosion risk to the reactor vessel since heat added to the coolant by the reactor core is removed before it makes contact with the shell of the reactor vessel. The arrangement reduces corrosion risk to the reactor coolant pump impeller as the primary coolant temperature is reduced by the PCHE before it enters the primary coolant pump plenum. The extended length of the plenum area adds mass above the free surface which offsets buoyancy of the PCHE in lead.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A pool type liquid metal fast spectrum reactor comprising:
    a vessel comprising a top lid, wherein the vessel houses a volume of a primary coolant therein, and wherein the volume of the primary coolant has a maximum level within the vessel;
    a lower plenum defined in the vessel;
    a reactor core disposed in the vessel above the lower plenum;
    an upper plenum defined in the vessel above the reactor core;
    a number of coolant pump inlet plenums defined in the vessel;
    a number of coolant pumps, each coolant pump being structured to move a fluid from one of the number of coolant pump inlet plenums to the lower plenum; and
    a number of printed circuit heat exchangers partially submerged below the maximum level of the primary coolant, each printed circuit heat exchanger disposed between the upper plenum and one of the number of coolant pump inlet plenums, each printed circuit heat exchanger comprising:
        a core formed from a stack of plates diffusion bonded together, the core having: a top face, a bottom face disposed opposite the top face, a first side face extending between the top face and the bottom face, and a second side face disposed opposite the first side face;
        a plurality of primary channels defined in the core, each of the primary channels extending from a primary inlet defined in the first side face to a primary outlet defined in the second side face, wherein each primary inlet is in direct fluid communication with the upper plenum, and wherein each primary outlet is in direct fluid communication with one coolant pump inlet plenum of the number of coolant pump inlet plenums; and
        a plurality of secondary channels defined in the core, each of the secondary channels extending transversely across at least some of the primary channels from a secondary inlet defined in the top face to a secondary outlet defined in the top face;
        an inlet plenum in fluid communication with the secondary inlets, wherein the inlet plenum extends from the top face and through the top lid, and wherein the inlet plenum comprises a main inlet configured to be fluidly coupled to a supply header at a location above the maximum level of the primary coolant; and
        an outlet plenum in fluid communication with the secondary outlets, wherein the outlet plenum extends from the top face and through the top lid, and wherein the outlet plenum comprises a main outlet configured to be fluidly coupled to a return header at a location above the maximum level of the primary coolant.

2. The pool type liquid metal fast spectrum reactor of claim 1, wherein:
    the inlet plenum defines a first space therein, the first space in fluid communication with the secondary inlets; and
    the outlet plenum defines a second space therein, the second space in fluid communication with the secondary outlets.

3. The pool type liquid metal fast spectrum reactor of claim 1, wherein the inlet plenum and the outlet plenum are disposed above the maximum level.

4. The pool type liquid metal fast spectrum reactor of claim 1, wherein the inlet plenum and the outlet plenum are disposed above the top lid.

5. The pool type liquid metal fast spectrum reactor of claim 1, wherein the secondary channels are semi-circular in cross-section.

6. The pool type liquid metal fast spectrum reactor of claim 1, wherein the number of printed circuit heat exchangers comprises a plurality of printed circuit heat exchangers; wherein the number of coolant pump inlet plenums comprises a plurality of coolant pump inlet plenums; wherein the number of coolant pumps comprises a plurality of coolant pumps; and wherein the plurality of printed circuit heat exchangers and the plurality of coolant pumps are arranged in pairs in an annular ring above and outboard of the reactor core.

7. The pool type liquid metal fast spectrum reactor of claim 1, wherein the number of printed circuit heat exchangers comprises six printed circuit heat exchangers, and wherein the number of coolant pumps comprises six coolant pumps.

8. The pool type liquid metal fast spectrum reactor of claim 1, wherein each printed circuit heat exchanger forms at least a portion of a partition separating the upper plenum from a respective coolant pump inlet plenum.

\* \* \* \* \*